United States Patent [19]

Hasegawa et al.

[11] Patent Number: 4,732,311
[45] Date of Patent: Mar. 22, 1988

[54] PROCESS OF PRODUCING LIGHTWEIGHT AND CORROSION-RESISTANT HEAT EXCHANGER

[75] Inventors: Yoshiharu Hasegawa, Ohbu; Yutaka Murakami, Nishio; Toshio Ohara, Kariya, all of Japan

[73] Assignees: Nippondenso Co., Ltd., Kariya; Furukawa Aluminum Co., Ltd., Tokyo, both of Japan

[21] Appl. No.: 8,041

[22] Filed: Jan. 21, 1987

Related U.S. Application Data

[63] Continuation of Ser. No. 739,475, May 30, 1985, abandoned.

[30] Foreign Application Priority Data

May 31, 1984 [JP] Japan .............................. 59-112232
May 31, 1984 [JP] Japan .............................. 59-112233

[51] Int. Cl.⁴ .............................................. B23K 9/225
[52] U.S. Cl. .................................... 228/138; 228/183; 228/263.17
[58] Field of Search ................. 228/183, 263.17, 263, 228/182, 263.12, 261, 138; 29/157.3, 726, 727

[56] References Cited

U.S. PATENT DOCUMENTS

| | | | |
|---|---|---|---|
| 3,440,712 | 4/1969 | Stroup | 228/263.17 |
| 3,748,729 | 7/1973 | Bottcher et al. | 228/263.12 |
| 3,889,745 | 6/1975 | Sizmonsen | 165/182 |
| 3,951,328 | 4/1976 | Wallace et al. | |
| 3,971,501 | 7/1976 | Cooke | |
| 3,985,283 | 10/1976 | Gempler | 228/193 |
| 4,233,719 | 11/1980 | Rhodes | 228/183 |
| 4,477,011 | 8/1984 | Austin | 228/263.17 |

FOREIGN PATENT DOCUMENTS

| | | | |
|---|---|---|---|
| 52-37457 | 9/1977 | Japan | 228/183 |
| 228870 | 2/1982 | Japan | 228/183 |
| 084826 | 5/1982 | Japan | 228/183 |
| 57-77683 | 5/1982 | Japan . | |
| 58-128384 | 8/1983 | Japan . | |
| 173079 | 10/1983 | Japan | 228/263.17 |
| 173530 | 8/1984 | Japan | 228/183 |
| 0145268 | 7/1985 | Japan | 228/183 |
| 917296 | 1/1963 | United Kingdom | 228/261 |

*Primary Examiner*—Nicholas P. Godici
*Assistant Examiner*—Karen Skillman
*Attorney, Agent, or Firm*—Cushman, Darby & Cushman

[57] ABSTRACT

A method of producing a lightweight and corrosion-resistant heat exchanger is disclosed. An aluminum tube with a plurality of passage bores therein is formed by extrusion. A layer of a brazing material comprising an aluminum alloy having an electrode potential value lower than that of the tube material is formed on the tube surface with the aid of a non-corrosive flux. The tube is bent into a zigzag winding form so as to have a plurality of substantially parallel runs. Corrugated fin members of aluminum or aluminum alloy are placed between respective adjacent runs of the tube. The tube and the fin members are heated together up to the melting point of the brazing material so that they are bonded together by the brazing material to form the heat exchanger.

21 Claims, 8 Drawing Figures

PROCESS OF PRODUCING LIGHTWEIGHT AND CORROSION-RESISTANT HEAT EXCHANGER

This is a continuation of application Ser. No. 739,475, filed May 30, 1985, which was abandoned upon the filing hereof.

BACKGROUND OF THE INVENTION

1. Field of the Invention

The present invention relates to a process of producing lightweight and corrosion-resistant heat exchangers suited for use in, for example, air conditioners for vehicles such as automobiles.

2. Description of the Prior Art

In the automobile industry, it is quite an important requirement to reduce the weights of automotive component parts for the purpose of improving fuel economy and, therefore, there is an increasing demand for lightweight heat exchangers, e.g., condensers and evaporators, for automotive air conditioners.

A typical conventional process for producing such a heat exchanger has the following steps:

(i) forming a continuous flat tube having a plurality of refrigerant passage bores by extrusion from a lightweight metal such as aluminum or its alloy, and bending or winding the flat tube to form a plurality of parallel runs;

(ii) placing corrugated fin members of an aluminum alloy each between an adjacent pair of the runs of the flat tube to form an assembly, the fin members each having an extremely small thickness on the order of 0.16 to 0.18 mm and being coated beforehand on their surfaces with a brazing material; and (iii) placing the assembly of the flat tube and the corrugated fin members in a heating oven with the aid of a suitable jig and heating the assembly to a temperature higher than the melting temperature of the brazing material to secure, by brazing, the corrugated fin members to the flat tube.

The aluminum alloy used as the material of the corrugated fin members is a "base" material having a lower electrode potential value than the material of the tube so that the corrugated fin members are corroded earlier than the tube when the heat exchanger is used under a corrosive condition, thus providing an effect which is generally known as "sacrificial corrosion effect". Namely, while corrosion of the fin members does not cauase any serious problem, even a small pin hole formed in the tube wall due to corrosion makes the heat exchanger as a whole unusable.

On the other hand, the brazing material applied beforehand to the surface of the fin member contains a large quantity of silicon which is added for the purpose of reducing the melting point of the brazing material. During the brazing, the silicon is undesirably diffused into the fin material to lower the melting point of the fin member itself. As a result, the fin member tends to be buckled by the pressure which is applied by the jig during the brazing. This is the reason why the thickness of the corrugated fin member could not be reduced.

Referring now to the tube, the aforementioned sacrificial corrosion effect which is provided by the corrugated fin members cannot be expected in the bent portions of the tube because the fin members are not present in such portions. In order to prevent corrosion of the bent portions of the tube, therefore, various measures have been proposed which include attaching sacrificial plates or applying a sacrificial coating material to the bent portions of the tube. These measures, however, are not desirable because the production cost is raised significantly.

Another measure for preventing the corrosion of the tube is to subject the tube surface to a zinc diffusion treatment. This method, however, encounters a problem due to difficulty in the disposal of the effluent from the treating bath.

In order to obviate these problems, the present inventors have already attempted a process for producing a heat exchanger in which the brazing material has been applied not to the thin corrugated fin members but to the tube itself which has a wall thickness much greater than that of the corrugated fin member, thus forming on the tube a clad of the brazing material and avoiding the aforementioned difficulty caused by the reduction in the melting point attributable to the diffusion of silicon. This process, however, has suffered from the following disadvantages. Namely, in contrast to the case where the brazing material is simply applied to a planar sheet material forming the corrugated fin members, the cladding of the tube with the brazing material caused a problem that, during the working of a sheet metal into an extruded flat tube with a plurality of passage bores, a part of the brazing material is moved into the passage bores. It is often experienced that the effective cross-sectional area of the passage bores is reduced due to re-melting of the brazing material by the heat which is applied during the brazing. In addition, after the brazing, a time-consuming and troublesome rinsing work is required to remove the flux material which is usually of the conventional, highly corrosive one containing $ZnCl_2$ as a main component.

SUMMARY OF THE INVENTION

Accordingly, an object of the invention is to provide an improved process of producing a heat exchanger which ensures remarkable advantages both in the reduction of weight and in the increase of the corrosion-resistant property of the heat exchanger.

According to the invention, there is provided a process for producing a lightweight and corrosion-resistant heat exchanger, comprising the steps of: forming a tube having a plurality of passage bores by extrusion from either one of aluminum and an aluminum alloy; coating the outer surface of the tube with a layer of a brazing material with the aid of a non-corrosive flux, the brazing material comprising an aluminum alloy having an electrode potential value lower than that of the material of the tube; bending, before or after the coating, the tube into a substantially zigzag winding form such that the bent tube has a plurality of substantially parallel runs; placing corrugated fin members of either one of aluminum and an aluminum alloy between adjacent runs of the tube; and heating the tube and the corrugated fin members at least to the melting point of the brazing material to bond the corrugated fin members to the tube by the brazing material.

This process offers the following advantages:

(a) Since the brazing material is applied to the surface of the tube which has a much greater thickness and correspondingly higher mechanical strength than those of the corrugated fin members, the corrugated fin members can have the minimum design thickness to assure a remarkable reduction in the weight. Furthermore, the specific brazing method employed in the process of the invention provides the following advantageous effects:

(b) According to the invention, the tube surface is beforehand coated with a layer of the brazing material. The brazing material has an electrode potential value lower than that of the tube material and the coating is conducted with the aid of a non-corrosive flux. Since the flux components remaining on the tube after the coating are not corrosive, the troublesome rinsing work which has hitherto been necessary can be eliminated. Rather, it is possible to make an efficient use of the remaining flux components in a subsequent step of brazing the corrugated fin members to the tube. In such a case, the application of a flux for use in the brazing can be omitted.

(c) The coating of the brazing material on the tube surface has a sacrificial corrosion effect so that a sufficiently high corrosion prevention effect is attained even at the bent portions of the tube where the corrosion is most likely to occur, thus providing a high corrosion prevention effect over the entire portions of the heat exchanger without such special after-treatments as have been required in the conventional processes.

The above and other objects, features and advantages of the invention will be made more apparent by the following description with reference to the accompanying drawings

DESCRIPTION OF THE PREFERRED EMBODIMENTS

Embodiments of the process for producing a lightweight and corrosion-resistant heat exchanger in accordance with the invention will be described hereinunder with reference to the accompanying drawings.

Figure 1:
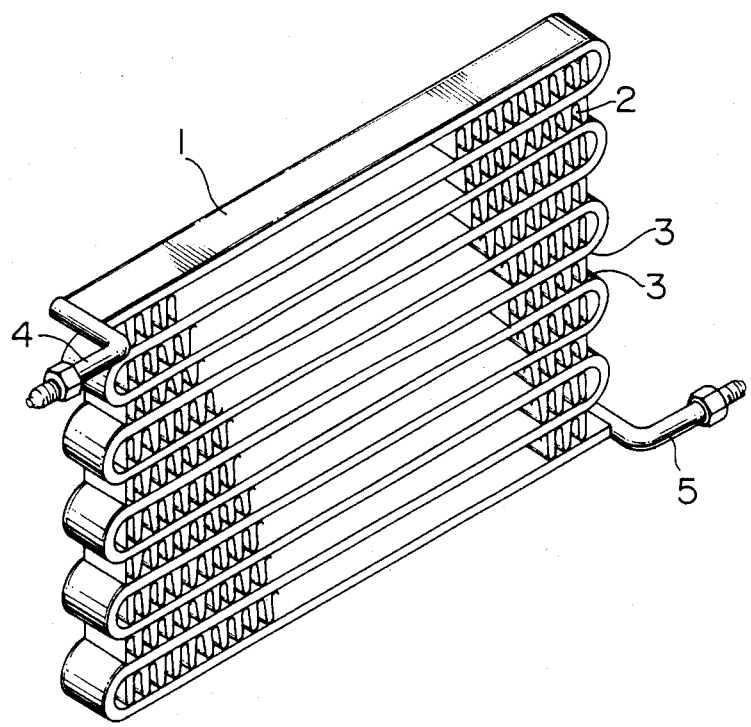
FIG. 1 is a perspective view of a heat exchanger produced by an embodiment of the process in accordance with the invention.
Figure 2:
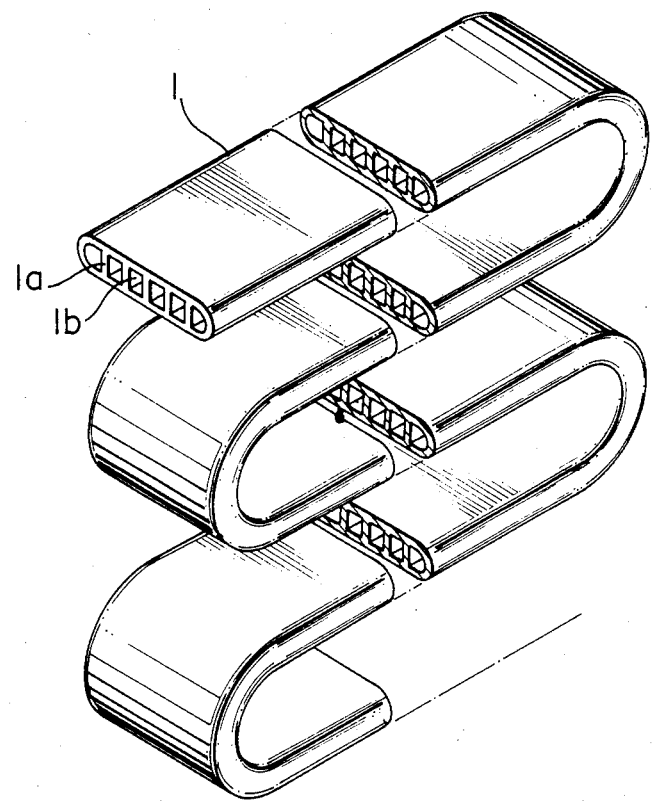
FIG. 2 is a partly-sectioned perspective view of a tube incorporated in the heat exchanger, showing in particular bent portions of the tube.

Referring first to FIG. 1 showing a condenser of an automotive air conditioner as an example of the heat exchanger, the major part of the heat exchanger is in the form of a flat or planar rectangular panel which is constituted by a continuous flat tube 1 bent at regular intervals into a zigzag winding form having a plurality of substantially parallel runs. The flat tube 1 is formed of a aluminum or an aluminum alloy and has a plurality of longitudinal passage bores separated by a plurality of partition walls 1a, as shown in FIG. 2. Corrugated fin members 2, each made of aluminum or an aluminum alloy and having an extremely small thickness, are respectively placed in the spaces between respective adjacent runs of the tube 1. The corrugated fin members are bonded to the runs of the tube 1 by means of an aluminum alloy brazing material with which the tube was coated beforehand. Pipe joints 4 and 5 are connected by brazing to both open ends of the zigzag tube 1.

A process embodying the invention for producing this heat exchanger will be explained hereinunder.

Figure 3:
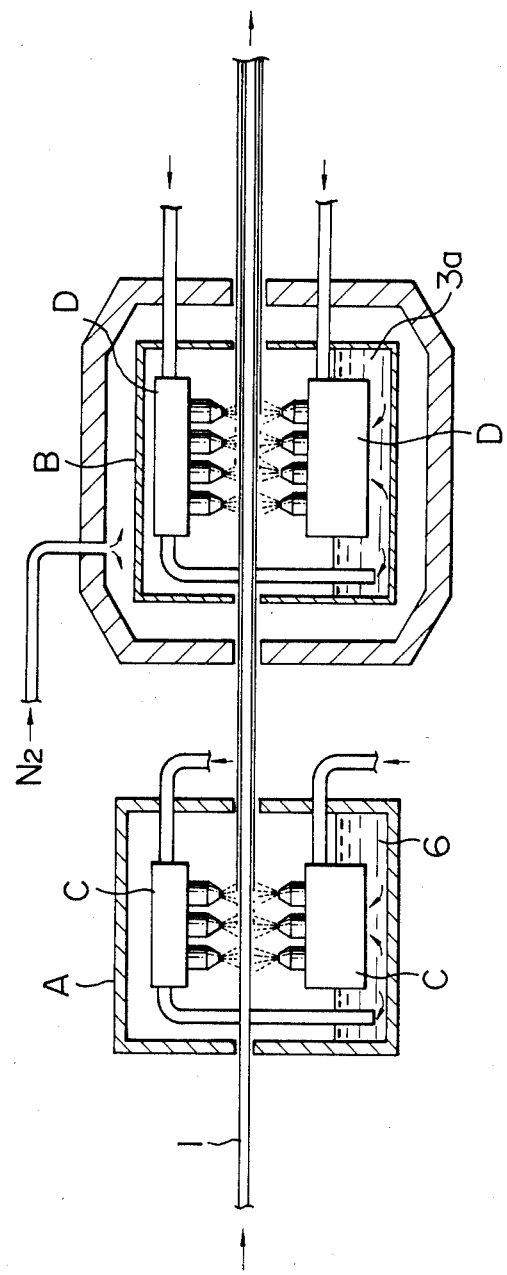
FIG. 3 is a schematic illustration of an embodiment of the process in accordance with the invention.
Figure 5:
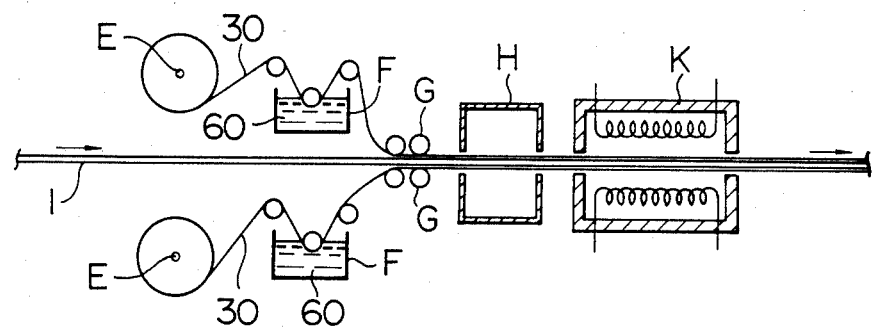
FIG. 5 is a schematic illustration of another embodiment of the process in accordance with the invention.

As the first step of the process, a flat tube 1 with a plurality of passage bores 1b and having a cross-section shown in FIG. 2 is formed by extrusion from aluminum or an aluminum alloy. The extruded flat tube 1 is continuously fed from the left to the right as viewed in FIG. 3 and brought first into a flux application apparatus A in which a non-corrosive flux 6 as a brazing assistant agent is jetted from nozzle devices C and applied to the outer surface of the tube 1. The tube 1 with the flux applied thereto is then brought into a coating apparatus B in which is stored a molten brazing material 3a. The space in the coating apparatus B is filled with nitrogen gas so that the brazing material 3a and the tube 1, which are heated at a high temperature of 590° to 605° C., are protected from oxidation. In the illustrated embodiment, the coating of the tube 1 with the brazing material is conducted by causing the tube 1 to move through sprays of the molten brazing material 3 sucked up and jetted from spraying devices D incorporating pumps therein.

The flux 6 used in the invention is a noncorrosive one selected from a group consisting of potassium fluoaluminate such as $KAlF_4$, $K_2AlF_5$ and $K_3AlF_6$ or their mixtures, rather than the conventionally used corrosive fluxes formed by mixtures of $ZnCl_2$, $NaCl$, $KCl$, $LiF$ and etc. On the other hand, the brazing material 3a used in the embodiment of the invention is an aluminum alloy having an electrode potential lower than that of the tube material and containing 10.0 wt % of silicon and 1.0 wt % of zinc.

Figure 4:
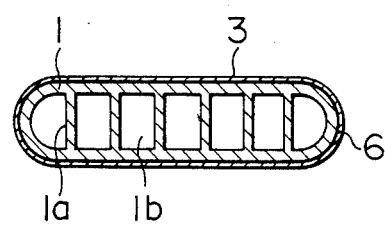
FIG. 4 is a cross-sectional view of a tube coated with a layer of a brazing material by the embodiment of the process shown in FIG. 3.

FIG. 4 shows a cross-section of the tube 1 coated with a solidified layer of the brazing material. The tube 1 is bent at regular intervals into a zigzag winding form to form a major part of the heat exchanger. Then, corrugated fin members are placed between respective adjacent runs of the zigzag tube and are pressed against the tube by a suitable jig and fixed to the tube to form an assembly which is then heated in a nitrogen gas atmosphere at 590° to 605° C. for 10 minutes within a heating oven, so that the solidified layer of the brazing material 3 is molten to rigidly secure the corrugated fin members 2 to the tube 1 by brazing. The brazing can be conducted satisfactorily by virtue of residual components of the flux 6 usd in the application of the brazing material layer 3. In order to obtain a higher brazing quality, however, it is advisable to apply a 5% solution of the same kind of flux to the layer of the bronzing material in advance of the brazing step.

It is to be understood that the coating of the tube 1 with the molten brazing material 3a by the assistance of the non-corrosive flux may alternatively be conducted after the tube 1 has been bent into the zigzag winding form.

Another embodiment of the invention will be described hereinunder with reference to FIGS. 5 to 8.

Figure 6:
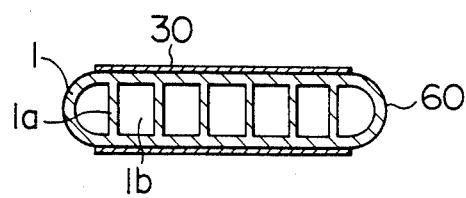
FIG. 6 is a cross-sectional view of a tube applied with foils of a brazing material by the embodiment shown in FIG. 5.

As the first step, a flat tube 1 having a cross-sectional shape as shown in FIG. 2 and a plurality of passage bores formed therein is formed by extrusion from aluminum or an aluminum alloy. The tube is then continuously fed from the left to the right as viewed in FIG. 5. A continuous web of foil 30 of a brazing material formed of rolled and pressed aluminum alloy containing silicon and zinc and having a width substantially equal to that of the tube 1 is unwound and fed form a reel E disposed at each side of the plane of the tube 1. The foil web 30 of the brazing material from each reel E is moved to pass through a flux bath F containing 10% solution 60 of a non-corrosive flux which is used as a brazing assistant agent. The foil web 30 is applied to each side of the tube 1 by means of foil application rollers G. FIG. 6 shows in cross-section the tube 1 with the foil webs 30 of the brazing material applied to the upper and lower sides of the flat tube 1.

The tube is then introduced into a drying oven H in which the water content of the flux is evaporated. Then, the tube 1 is moved through a brazing furnace K which encloses an anti-oxidating nitrogen gas atmosphere kept at 600° to 610° C. so that the foil webs 30 of the brazing material are molten and fixed to the upper and lower surfaces of the flat tube 1. The brazing material constituting the foil webs 30 should preferably have an electrode potential value lower than that of the material of the tube 1 so that the foil webs 30 after being fixed to the tube exhibit a sacrificial corrosion effect with respect to the tube material. An example of such brazing material is an aluminum alloy containing 10.0 wt % of silicon and 1.0 wt % of zinc. Various experimental tests conducted by the inventors showed that good results are obtained when the thickness of the foil webs 30 of the brazing material ranges from 20 to 200 μm. Taking into account various factors such as the strength of the bond between the fin members 2 and the tube 1, sacrificial corrosion effect of the brazing material with respect to the tube 1 and the consumption of the brazing material, foil web thickness of around 100 μm has been found to be optimum.

Conventionally used fluxes containing $ZnCl_2$, NaCl, KCl or LiF exhibit strong corroding effects to metals and, hence, a troublesome and money-consuming work is required to remove residual flux components after the brazing. In order to obviate this problem, a non-corrosive flux consisting of potassium fluoaluminate such as $KAlF_4$, $K_2AlF_5$ and $K_3AlF_6$ or their mixtures is used as the flux in this embodiment.

Figure 7:
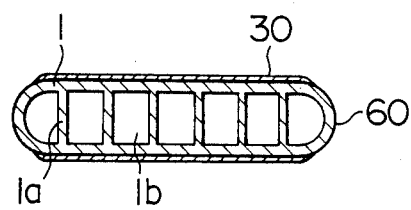
FIG. 7 is a cross-sectional view of the tube in the state after melting of the brazing material foils.

FIG. 7 shows in cross-section the tube 1 with layers 30 of the brazing material fused thereto.

The tube 1 thus coated with the layers 30 of the brazing material is bent at regular intervals into a zigzag winding form and fin members 2 are then placed between respective adjacent runs of the tube 1. The tube 1 and the fin members 2 are subjected to a brazing step in which they are placed in a nitrogen gas atmosphere at 590° to 605° C. for about 10 minutes. The brazing can be made satisfactorily by virture of residual components of the flux used in the fixing of the brazing material foil webs 30 to the tube. However, a higher brazing quality will be obtained by applying a 5% solution of the flux of the same kind to the foil webs 30 on the tube in advance of the brazing.

The application of the webs of the brazing material to the tube facilitates the formation of thicker layers of the brazing material layers on the tube, which in turn ensures a higher bonding strength and formation of brazing material layers of a substantially uniform thickness with a resultant reduction of the consumtion of the brazing material.

Figure 8:
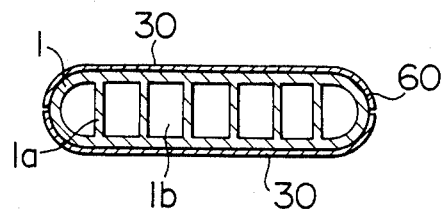
FIG. 8 is a cross-sectional view of another example of the tube applied with foils of the brazing material.

In the illustrated embodiment, the foils 30 are arranged to cover the upper side and the underside of the tube 1 so as to leave the side edge faces of the tube uncovered, but it will be apparent to those skilled in the art that the foils 30 may alternatively be arranged to cover substantially the whole outer surface of the tube, as shown in FIG. 8.

In the conventional process in which the brazing material is first applied to the surface of the fin member, the thickness of the fin member has to be 0.13 mm at the smallest in order to avoid buckling of the fin members due to reduction in the buckling strength attributable to diffusion of silicon content of the brazing material into the fin material. In the described embodiment, however, the buckling of the fin members can be avoided almost perfectly because the brazing material is applied to the tube. Consequently, in the described embodiment of the process, fin members having a thickness much smaller than that in the conventional process can withstand the sever condition of heating at 590° to 605° C. for 10 minutes during the brazing without any risk of buckling.

In order to confirm the effect of the invention, the inventors conducted a test in which heat exchangers were produced by the process of the invention and by the conventional process with the fin thicknesses varied in the range between 0.16 and 0.07 mm, and the fin thickness at which the buckling of the fin members took place was measured. The result of this test is shown in Table 1 below.

TABLE 1

| Fin Thickness (mm) | Fin Buckling | |
|---|---|---|
| | Process of Invention | Conventional Process |
| 0.16 | | |
| 0.14 | | |
| 0.13 | | |
| 0.12 | | X |
| 0.11 | | X |
| 0.10 | | X |
| 0.08 | | X |
| 0.07 | X | X |

No buckling Observed
X Buckling Observed

From this Table, it will be seen that, in the process in accordance with the invention, the fin thickness can be reduced to 0.08 mm without the risk of buckling, whereas the conventional process in which the brazing material is first applied to the fin member experiences buckling without exception when the fin thickness is reduced down below 0.12 mm. This comparison shows that the process in accordance with the invention greatly contributes to reduction in the weight of the heat exchangers.

In another test conducted by the inventors, the corrosion resistance was evaluated on the bent portions of the heat exchanger tubes where the corrosion is most likely to occur. The heat exchangers presented to the test were ones produced by the process of the invention and by the conventional process. The evaluation of the corrosion resistance was conducted by subjecting the heat exchangers to a corrosion test as specified in JIS (Japanese Industrial Standard) D 0201 (CASS Test Method). The results of the test are shown in Tables 2A and 2B.

TABLE 2A

| | Result of Corrosion Text (Present Invention) | | | | |
|---|---|---|---|---|---|
| Samples | Product A of Invented Process | Product B of Invented Process | Product C of Invented Process | Product D of Invented Process | Product E of Invented Process |
| Materials | | | | | |
| Tube | AA1050 | Al—0.5Cu | Al—1.2Mn | Al—0.5Cu | Al—0.5Cu |
| Brazing Material (Aluminum Alloy) | Al—10Si —1.0Zn | Al—10Si —0.7Zn | Al—10Si —1.0Zn | Al—10Si —5.0Zn | Al—10Si —10.0Zn |
| Fin | Al—1.2Mn —1.0Zn | Al—1.2Mn —1.0Zn | Al—1.2Mn —0.5Zn | Al—1.2Mn —1.0Zn | Al—12Mn —1.5Zn |
| Time Duration Until Leaking Under JIS D 0201 Test Condition | No leak after 700 hrs. | No leak after 700 hrs. | No leak after 700 hrs. | No leak after 800 hrs. | No leak after 1000 hrs. |

TABLE 2B

| | Result of Corrosion text (Prior Art) | |
|---|---|---|
| Samples | Product A of Conventional Process | Product B of Conventional Process |
| Materials | | |
| Tube | AA1050 | Al—0.5Cu |
| Fin | | |
| Fin Core | Al—1.2Mn —1.0Zn | Al—1.2Mn —1.0Zn |
| Brazing Material | Al—10Si —1.0Zn | Al—10Si |
| Time Duration Until Leaking Under JIS D 0201 Test Condition | Leak observed at Tube Bends after 300 hrs | Leak observed at Tube Bends after 300 hrs |

In these tables, the contents of components are shown in terms of percentages by weight (wt %).

While the samples A and B of heat exchangers produced by the conventional process showed leakage due to corrosion of the bent portions of the tubes in 300 hours after the commencement of the test irrespective of the materials of the tubes, as shown in Table 2B, the heat exchangers A, B and C produced by the process of the invention did not show any leakage of refrigerant regardless of the tube materials and even after a long testing period of 700 hours. Thus, it will be appreciated that the products by the present invention prove superior resistance to corrosion.

In addition, it has also been confirmed through the test that the corrosion resistant property can further be improved by increasing the Zn content of the brazing material (see the products D and E in Table 2 wherein the Zn contents are 5.0% and 10.0%, respectively).

Although the invention has been described with specific reference to heat exchangers of automotive air conditioners, it will be apparent to those skilled in the art that the invention can be equally applied to other various heat exchangers having similar constructions.

It is to be understood that, although the electrode potential values of the brazing material layer 3 and the fin member 2 used in the described embodiments are lowered by using, as the materials, aluminum alloys containing zinc (Zn), this is not exclusive and the reduction of the electrode potential values may alternatively be achieved by using tin (Sn) in place of zinc (Zn) as known in the art.

What is claimed is:

1. A method of producing a lightweight and corrosion-resistant heat exchanger, comprising the steps of:
    forming a tube having a plurality of passage bores by extrusion form one of aluminum and an aluminum alloy;
    coating at least a part of the outer periphery of said tube, as viewed in cross-section, with a layer of a brazing material with the aid of a non-corrosive flux applied to one of said tube and said layer such that said layer of brazing material extends over the entire length of said tube, said brazing material comprising an aluminum alloy including zinc silicon and having an electrode potential value lower than that of the material of said tube;
    bending said tube into a substantially zigzag winding form such that the bent tube has a plurality of substantially parallel runs and a plurality of bent portions each interconnecting an adjacent pair of said runs;
    placing corrugated fin members of one of aluminum and an aluminum alloy between adjacent runs of said tube, respectively, such that said fin members are not in contact with said bent portions of said tube, said fin members being uncoated with any layer of brazing material and each having a thickness of less than 0.12 mm; and
    heating said tube and said corrugated fin members at least to the melting point of said brazing material to bond said corrugated fin members to said tube by said brazing material.

2. A process as claimed in claim 1, wherein said coating step includes spraying said brazing material in molten state on said tube.

3. A rpocess as claimed in claim 1, wherein said non-corrosive flux is of potassium fluoroaluminate type.

4. A process as claimed in claim 1, wherein said brazing material essentially consists of 10.0 wt % of silicon, 1.0 wt % of zinc and the balance formed by aluminum and inevitable impurities.

5. A process as claimed in claim 1, wherein said brazing material essentially consists of 10.0 wt % of silicon, 0.7 wt % of zinc and the balance formed by aluminum and inevitable impurities.

6. A process as claimed in claim 1, wherein said corrugated fin members each have a thickness of from 0.07 mm to 0.16 mm.

7. A process as claimed in claim 1, wherein the material of said corrugated fin members essentially consists of 1.2 wt % of Mn, 1.0 wt % of Zn and the balance formed by aluminum and inevitable impurities.

8. A process as claimed in claim 1, wherein the material of said corrugated fin members essentially consists of 1.2 wt % of Mn, 0.5 wt % of Zn and the balance formed by aluminum and inevitable impurities.

9. A process as claimed in claim 1, wherein the step of heating said corrugated fin members to bond them to said tube is conducted by heating said tube, said layer of said brazing material and said corrugated fin members at 590° to 605° C. for about 10 minutes in a nitrogen gas atmosphere.

10. A process as claimed in claim 1, further including a step of applying an additional layer of the same kind as the first said flux to the outer surface of said layer of said brazing material in advance of said heating step.

11. A process as claimed in claim 1, wherein said layer of brazing material is formed by preparing a foil of said brazing material and applying said foil to said tube with the aid of said non-corrosive flux in advance of said bending step.

12. A process as claimed in claim 11, wherein said foil of brazing material has a thickness ranging from 20 to 200 μm.

13. A process as claimed in claim 11, wherein said tube has a generally planar cross-section having two major surfaces and each of said major surfaces is covered by said foil of said brazing material.

14. A process as claimed in claim 11, wherein said tube has a generally planar cross-section and substantially the entire circumferential surface of said tube is covered by a pair of such foils of said brazing material.

15. A process as claimed in claim 1, wherein said tube-bending step is conducted after said coating step.

16. A process as claimed in claim 2, wherein said tube-bending step is conducted before said coating step.

17. A process as claimed in claim 2, wherein said tube-bending step is conducted after said spraying step.

18. A process as claimed in claim 2, wherein said tube-bending step is conducted before said spraying step.

19. A process as claimed in claim 1, wherein said brazing material essentially consists of 10.0 wt % of silicon, 5.0 wt % of zinc and the balance formed by aluminium and inevitable impurities.

20. A process as claimed in claim 1, wherein said brazing material essentially consists of 10.0 wt % of silicon, 10.0 wt % of zinc and the balance formed by aluminium and inevitable impurities.

21. A process as claimed in claim 11, wherein said foil is applied to said tube and then said tube with said foil thereon is heated in an anti-oxidating atmosphere to a temperature at which said foil is molten and fixed to said tube with the aid of said non-corrosive flux.

* * * * *